United States Patent [19]
Chiappa

[11] Patent Number: 5,958,489
[45] Date of Patent: Sep. 28, 1999

[54] METHOD AND EQUIPMENT FOR THE PRODUCTION OF A MIXTURE OF SOLID PARTICLES DISPERSED IN A CONTINUOUS LIPID PHASE, PARTICULARLY CHOCOLATE AND ITS DERIVATIVES

[75] Inventor: Ottorino Chiappa, Milan, Italy

[73] Assignee: Mazzoni LB Food S.r.l., Varese, Italy

[21] Appl. No.: 08/610,668

[22] Filed: Mar. 4, 1996

[30] Foreign Application Priority Data

Mar. 9, 1995 [EP] European Pat. Off. ............. 95830087

[51] Int. Cl.⁶ .................................................. A23G 9/20
[52] U.S. Cl. ..................... 426/294; 426/295; 426/312; 426/470; 426/519; 426/631; 426/659
[58] Field of Search .................... 426/294, 295, 426/312, 470, 519, 631, 659

[56] References Cited

U.S. PATENT DOCUMENTS 2,915,023  12/1959  Rapaport .
4,042,721  8/1977   Ziccarelli .
4,413,913  11/1983  Hold et al. .

FOREIGN PATENT DOCUMENTS

| 0032217 | 7/1981 | European Pat. Off. . |
| 0157594 | 10/1985 | European Pat. Off. . |
| 2444499 | 7/1980 | France . |
| 2444548 | 7/1980 | France . |
| WO 93/24018 | 12/1993 | Germany . |
| 995984 | 9/1965 | United Kingdom . |

*Primary Examiner*—David W. Wu
*Attorney, Agent, or Firm*—Kinney & Lange, P.A.

[57] ABSTRACT

A method for the production of a mixture of solid particles dispersed in a continuous lipid phase which enables a mixture to be obtained with the optimum organoleptic characteristics includes a mixing step in which the solid particles are mixed with the lipids to form a mixture, a refining step in which the solid particles are ground and a step in which micronized bubbles of gaseous fluid are incorporated in the mixture by means of at least one microporous diffuser.

25 Claims, 6 Drawing Sheets

METHOD AND EQUIPMENT FOR THE PRODUCTION OF A MIXTURE OF SOLID PARTICLES DISPERSED IN A CONTINUOUS LIPID PHASE, PARTICULARLY CHOCOLATE AND ITS DERIVATIVES

FIELD OF THE INVENTION

The present invention relates to a method for the production of a mixture of solid particles dispersed in a continuous lipid phase, particularly chocolate and its derivatives, comprising a step in which the solid particles and lipids are mixed and the resulting mixture is subjected to a refining step in which the solid particles are ground.

BACKGROUND OF THE INVENTION

Chocolate and its derivatives are a specific type of mixture in which sugar and cocoa solids are dispersed in a continuous phase constituted by cocoa butter.

It is known that the production of chocolate includes the operations of:

metering sugar, cocoa in paste or solid form, cocoa butter, powdered milk and other ingredients, mixing the ingredients to form a mixture, refining the mixture by reducing the particle dimensions, and conching.

Among these operations, conching is of fundamental importance and is absolutely critical with regard to the final quality of the chocolate. In fact conching, by removing a certain proportion of moisture and other volatile components, for example acetic acid, butyric acid, valeric acid and other components in the mixture enables the organoleptic characteristics of the chocolate to develop.

Up till now, the conching has been carried out by mechanical working of the mixture in metal conches in which a large quantity of refined chocolate mixture is mixed slowly and without interruption for about 24–80 hours at a temperature of between 40° C. and 90° C. according to the type of chocolate it is intended to produce.

One is dealing essentially with a discontinuous production method in which a large quantity of mechanical energy is transferred to the mixture.

For this purpose it is important to note that the more slowly this energy transfer occurs the better the organoleptic properties of the final product.

It has been shown (by A. G Lipscomb as cited by H. Fincke in "Handbuch der Kakaoerzeugnisse", page 225, second edition, Springer-Verlag, Berlin 1965) that, by extending the duration of the conching so as to expose the mixture to air for a longer time, the organoleptic characteristics of the final product are improved appreciably. This is due not only to the removal of a greater quantity of moisture and volatile components from the mixture but also to the oxidation of the solid particles which may occur in the mixture during the prolonged exposure to air while the fatty phase is protected by the presence of natural anti-oxidants.

Although, on the one hand, the prior art is able to provide a good chocolate, on the other hand it has the disadvantage that the refining and conching require machinery with a low productivity and high consumption of energy which do not make it convenient to prolong the conching excessively.

The problem at the basis of the present invention is that of devising a method for the production of a mixture of the type specified which enables all the problems mentioned above with reference to the prior art to be overcome and which enables the organoleptic characteristics of the finished product to be improved appreciably.

SUMMARY OF THE INVENTION

This problem is solved in accordance with the invention by a method of the type specified which is characterised in that it includes a step in which micronized bubbles of a gaseous fluid are incorporated in the mixture by means of at least one microporous diffuser.

The present invention also relates to equipment for the production of a mixture of solid particles dispersed in a continuous lipid phase of the type comprising a mixer for mixing the starting materials to form the mixture, at least one mill for grinding the mixture, at least one duct connecting the mixer to the mill and through which the mixture flows, pumps for pumping the mixture between the mixer and the mill and means for blowing a gaseous fluid into the mixture, characterised in that the said means include at least one microporous diffuser whereby micronized bubbles of the gaseous fluid are blown into the mixture.

BRIEF DESCRIPTION OF THE DRAWINGS

To provide an understanding of the invention and its advantages, a detailed description of a preferred embodiment of equipment for the production of a mixture of solid particles dispersed in a continuous lipid phase, made with reference to the appended drawings, and one embodiment of the method of the invention are given below purely by way of non-limitative example. In the drawings.

DETAILED DESCRIPTION OF THE PREFERRED EMBODIMENTS

Figure 1:
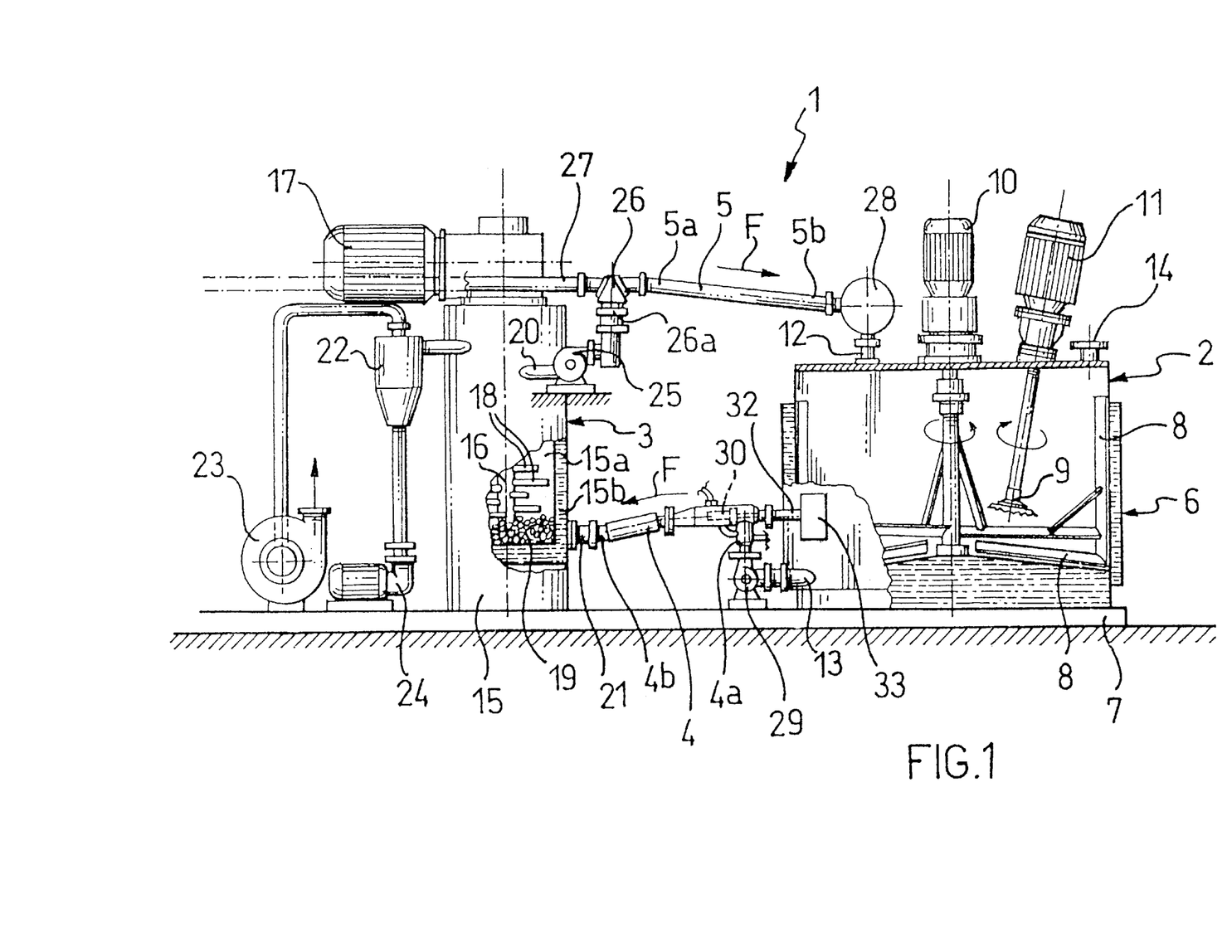
FIG. 1 is a schematic view of equipment according to the present invention.
Figure 2:
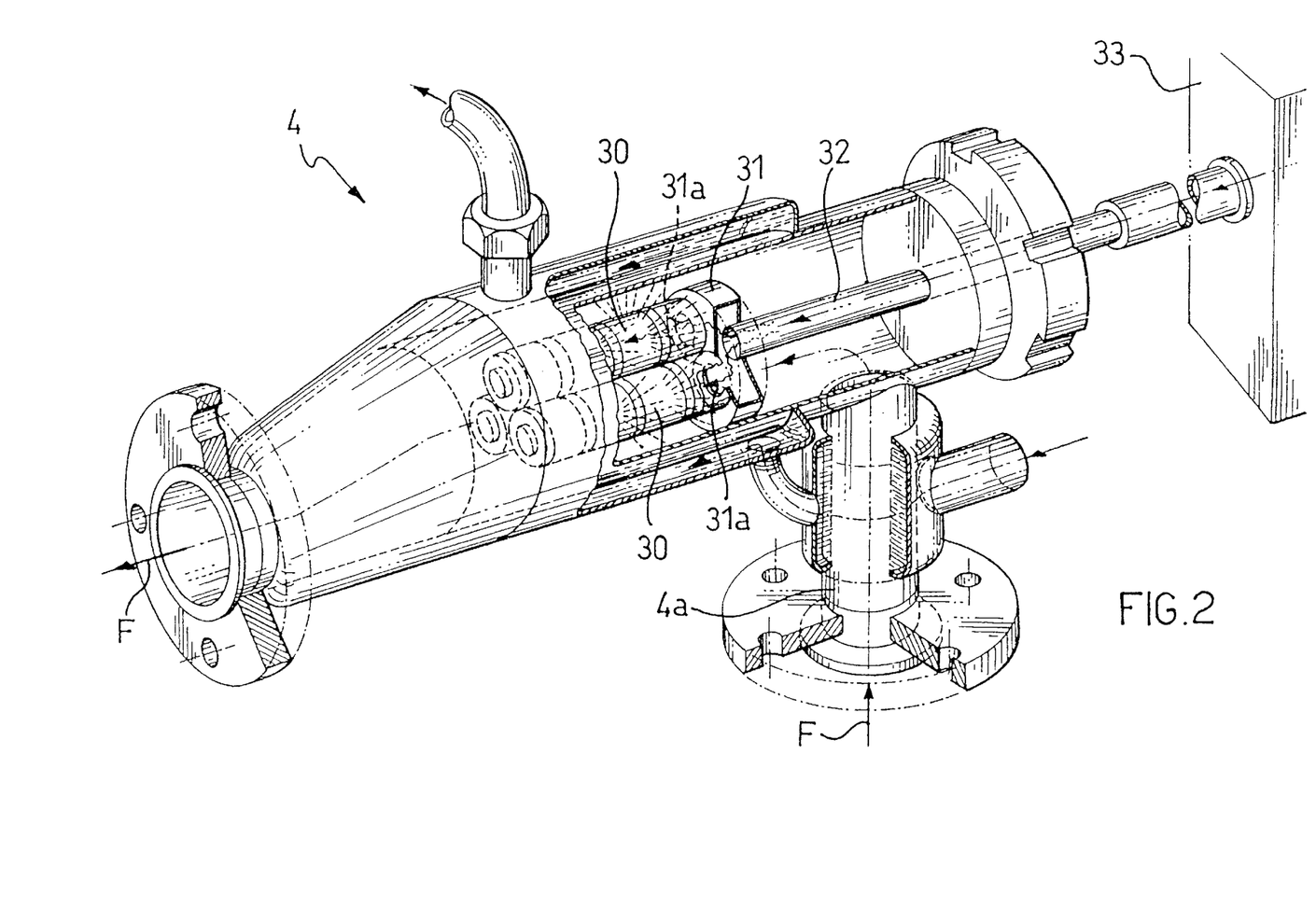
FIG. 2 is a perspective view of a detail of the equipment of FIG. 1.

With reference to FIGS. 1 and 2, equipment according to the present invention for the production of a mixture of solid particles dispersed in a continuous phase is generally indicated 1. The description is made with reference to chocolate in which solid sugar and cocoa particles are dispersed in a lipid phase of cocoa butter and the gaseous fluid blown in is deodorised, sterilised compressed air.

The equipment 1 includes a mixer 2 and a grinding mill 3 interconnected by tubular ducts 4 and 5. A flow F of mixture flows through the duct 4 from the mixer 2 to the mill 3 while in the duct 5 it flows in the opposite direction. The ducts 4 and 5 are preferably made from stainless steel and are of the type with an outer jacket through which water is circulated at a thermostatically controlled temperature from an hydraulic circuit not shown.

The mixer 2 comprises a cylindrical body 6 which extends vertically from a rectangular platform 7 which supports and anchors the apparatus 1. The body 6 is preferably made from stainless steel sheet with an outer interspace through which water is circulated at a thermostatically controlled temperature. Within the mixer 2 there are scrapers 8 for scraping the walls and bottom and a disc-shaped disperser 9 driven by respective electric motors 10 and 11. Flanged sleeves 12 and 13 project from the upper and lower parts of the body 6 for the input of the mixture into the mixer 2 and its output therefrom respectively. The body 6 has upper openings 14 through which it can be loaded with the ingredients for the mixture.

The grinding mill 3 is of the ball type and comprises a cylindrical body 15 which extends vertically from the rectangular platform 7. The body 15 is constituted by an inner grinding chamber $15_a$ of abrasion-resistant alloy and an outer jacket $15_b$ of stainless steel which forms an interspace with the chamber $15_a$ in which the thermostatically-controlled water is circulated. The mill 3 houses a vertical shaft 16 supported for rotation and connected to be driven by an electric motor 17. The shaft 16 has stirring arms 18 for moving grinding balls 19 in the inner grinding chamber $15_a$. The balls 19 are preferably of steel with a high resistance to abrasion. Flanged sleeves 20 and 21 project from the upper and lower parts respectively of the mill 3 for the outlet of the mixture from the grinding chamber $15_a$ and its inlet thereinto. The interior of the grinding chamber $15_a$ communicates with a decanting and consolidating cyclone 22 which is connected to a centrifugal aspirator 23 and to a vacuum pump 24, preferably of the liquid-ring type.

A geared pump 25 for withdrawing the mixture from the mill 3 has its inlet connected to the sleeve 20 and its delivery to an inlet $26_a$ of a three-way valve 26. The valve 26 has two outputs that are respectively connected to a first end $5_a$ of the duct 5 and to a tube 27 for discharging the mixture from the apparatus 1.

An inlet of a fluidising apparatus 28 for fluidising the mixture is connected to a second end $5_b$ of the duct 5 while its outlet is connected to the flanged sleeve 12 of the mixer 2. The fluidising apparatus 28, as will be described more fully below, enables the mixture to be fluidised.

A geared pump 29 for removing the mixture from the mixer 2 has its inlet connected to the sleeve 13 and its delivery to a first end $4_a$ of the duct 4. A second end $4_b$ of the duct 4 is connected to the flanged sleeve 21 of the mill 3.

The pumps 25 and 29, the valve 26 and the fluidising apparatus 28 are of the type with outer jackets defining interspaces through which water is circulated at a thermostatically-controlled temperature.

A plurality of circular-section, microporous, tubular diffusers 30, in the embodiment shown three, (FIG. 2), extend parallel to each other in an axial direction, within the duct 4. The diffusers 30 are sealed at one end while their opposite ends are fixed to a hollow circular support 31 in correspondence with its apertures $31_a$ for supplying fluid. The hollow support 31 is in fluid communication through a tube 32 with a complex 33 for the filtering, deodorising and sterilising of air, the inlet of which is connected to a pressurised air distribution line, not shown. The diffusers 30 are preferably of sintered stainless steel with a pore size of 5 μm.

Figure 3:
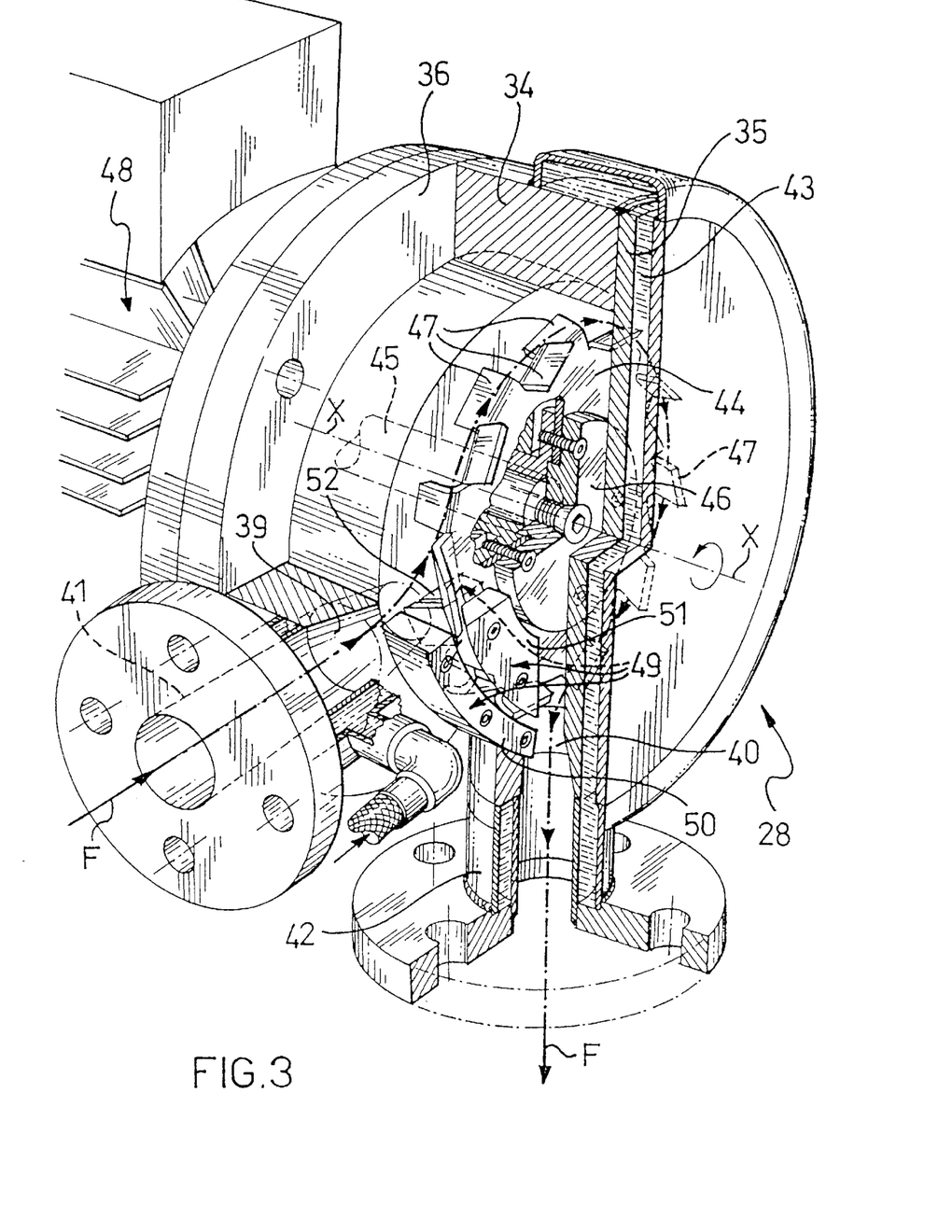
FIG. 3 is a perspective view of a fluidising apparatus forming part of the equipment of FIG. 1.
Figure 4:
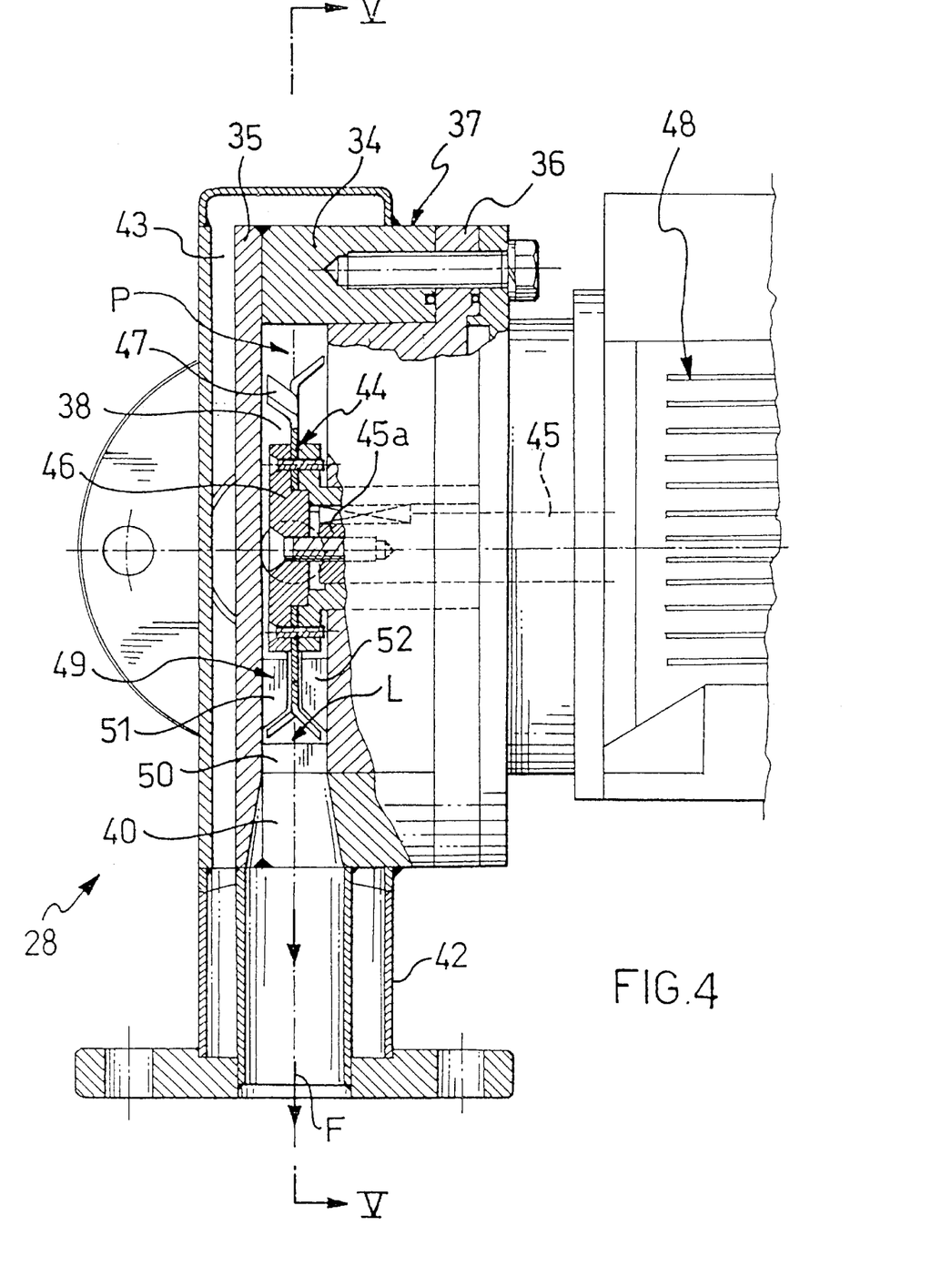
FIG. 4 is a section of the fluidising apparatus of FIG. 3.
Figure 5:
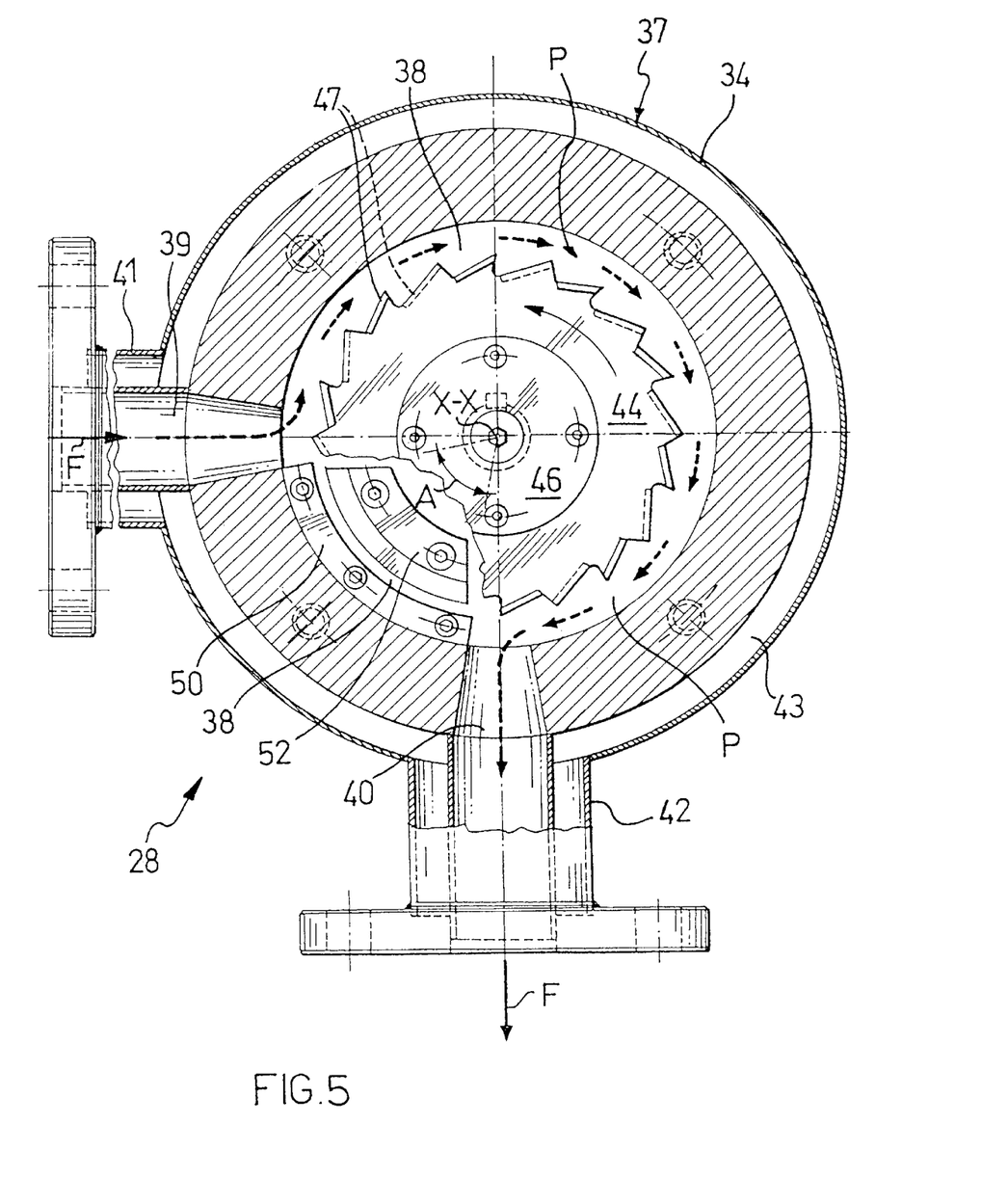
FIG. 5 is a sectional view of the fluidising apparatus of FIG. 3 taken on the line V—V of FIG. 4.

With reference to FIGS. 3 to 5, fluidising apparatus generally indicated 28 comprises an annular body 34 having an axis X—X and having one end wall 35 and sealed by a cover 36 at its opposite end. The annular body 34, the end wall 35 and the cover 36 form a casing 37 which delimits an annular chamber 38.

The casing 37 is preferably of stainless steel and has an inlet aperture 39 and an outlet aperture 40 from which respective flanged sleeves 41 and 42 project outwardly of the casing 37. The flanged sleeves 41 and 42 are connected so as to be in fluid communication with the duct 5 (FIG. 1) and with the flanged sleeve 12 of the mixer 2 (FIG. 1) respectively. Preferably the apertures 39 and 40 are arranged in the periphery of the annular body 34 on respective radii.

The annular body 34 defines an outer interspace 43 in which thermostatically-controlled water is circulated.

The annular chamber 38 contains a rotor 44 driven by an electric motor 48. More particularly, the rotor 44 is keyed coaxially on a first end $45_a$ of a shaft 45 which is rotatably inserted through the cover 36 into the casing 37 coaxially of the annular body 34. The opposite end of the shaft 45 is connected to the motor 48.

The rotor 44, in itself conventional, comprises a disc with a plurality of peripheral blades 47 carried by a hub 46. The blades 47 are able to fluidise the mixture by supplying mechanical energy in the form of cutting forces.

A baffle 49 is inserted in the annular chamber 38 astride the rotor 44 so as to render one arc of the annular chamber 38 unusable and to create an obligatory pathway P for the mixture along a further arc extending from the inlet aperture 39 to the outlet aperture 40. The apertures 39 and 40 are arranged on either side of the baffle 49 at a predetermined angle A, preferably of 90°. The said obligatory pathway P thus extends through an angle of 270°.

The baffle 49 includes portions 50, 51 and 52 extending along circumferential arcs concentric with the axis X—X and fixed to the annular body 34, the end wall 35 and the cover 36 respectively. These portions define an opening L for the passage of the rotor 44.

With reference to FIGS. 1 to 5, the operation of the apparatus for the production of a mixture of solid particles suspended in a continuous lipid phase according to the present invention is described below with reference to an initial condition in which the ingredients of the mixture, mainly sugar, cocoa and cocoa butter, have been loaded into the mixer 2 while the thermostatically-controlled water is circulated in the interspaces at a temperature such as to maintain the cocoa butter phase fluid.

Within the mixer 2, the disc disperser 9 and the scrapers 8 mix the components to form a mixture.

The pump 29 withdraws the mixture from the mixer 2 and forces it through the duct 4 to the inlet 21 of the grinding mill 3.

The microporous diffusers 30 blow pressurised air into the mixture flowing through the duct 4, the air being supplied from the said distribution line. Before being blown into the mixture, the air is filtered, deodorised and sterilised in the complex 33. It should be noted that the air blown into the mixture in the form of micronized bubbles is absorbed temporarily by the mixture which increases in volume.

In the mill 3, the mixture is refined by grinding of the solid particles. This grinding is carried out by the balls 19 which are forced to move within the mill 3 by the stirring arms 18 of the shaft 16. The pump 25 withdraws the mixture from the mill 3 and passes it into the duct 5 through the valve 26.

Before returning to the mixer 2, the mixture is conveyed into the fluidising apparatus 28 in which the rotor 44 is rotated by the electric motor 48 so that the blades 47 have a peripheral velocity which is opposed to the velocity of the mixture in the obligatory pathway P. The fluidiser 28 fluidises the mixture and transfers a large quantity of mechanical energy to it in the form of cutting forces.

The aspirator 23 removes both the air absorbed and the volatile components and moisture from the mixture in the mill 3.

The recycling of the mixture from the mixer to the mill continues until a chocolate is obtained with the desired structural, rheological and organoleptic characteristics.

Before the end of the cycle, the introduction of air through the micronized diffusers 30 is stopped and the vacuum pump 24 is started so as to remove the air absorbed by the mixture completely.

Once the cycle of working of the mixture is completed, the mixture is discharged from the equipment 1 through the discharge duct 27.

Figure 6:
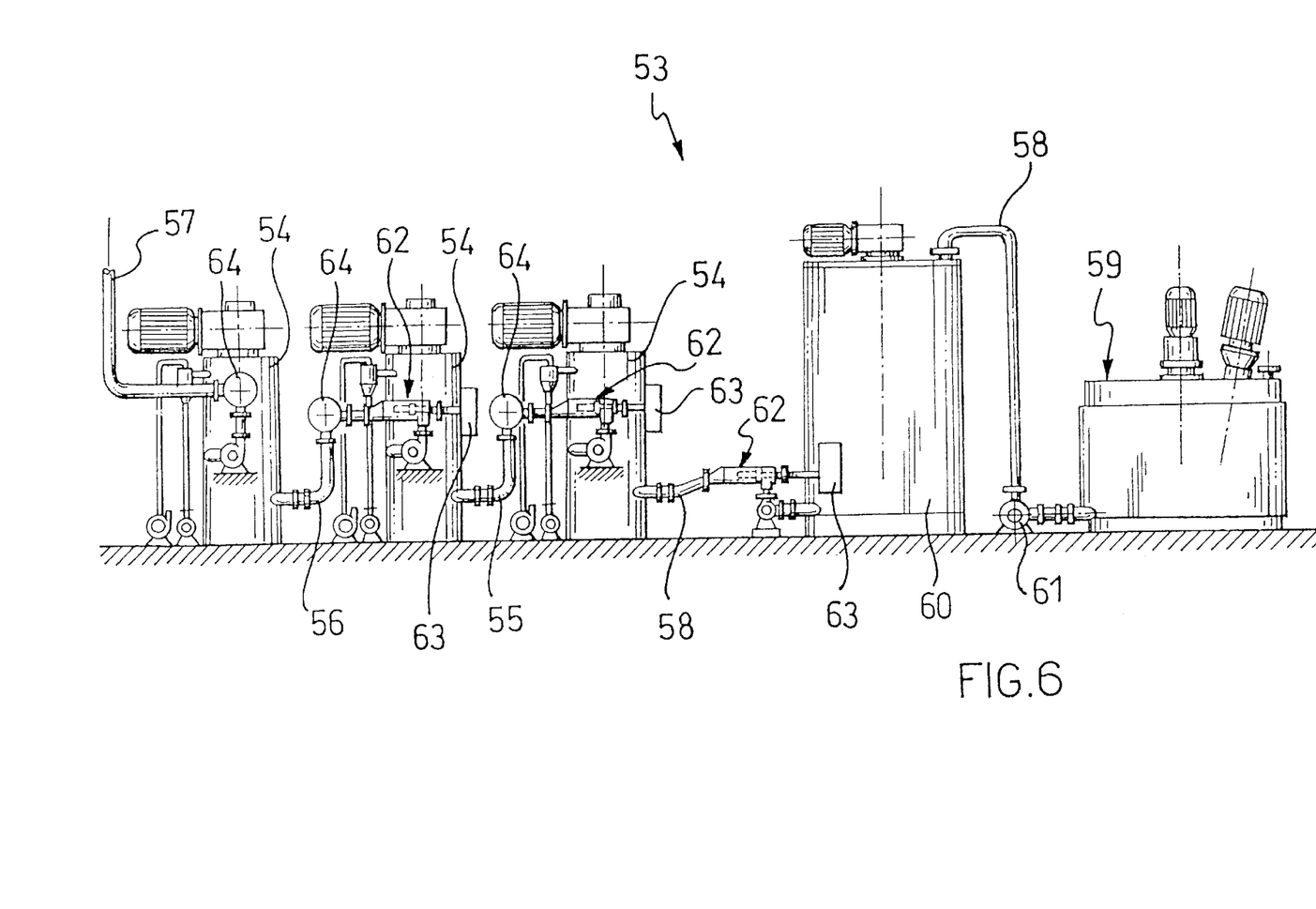
FIG. 6 is a schematic view of a different embodiment of equipment according to the present invention.

FIG. 6 shows a different embodiment of equipment according to the present invention, generally indicated 53.

The equipment 53 differs from the equipment 1 described above in that the mill 3 is replaced by a plurality of grinding mills of which there are three in the example illustrated, indicated 54, connected in series by tubes 55 and 56 through which the mixture flows. The outlet of the plurality of mills 54 is connected to a duct 57 for discharging the mixture from the equipment 53.

A tube 58 transfers the mixture from a mixer 59 to the plurality of mills 54. In a preferred embodiment, a tank 60 for storing the mixture is inserted in the tubular duct 58 in fluid communication therewith.

The mixer 59 is provided with a geared pump 61 for withdrawing the mixture.

The tubes 55, 56 and 58 contain microporous diffusers 62 similar to the diffusers 30 described above. The microporous diffusers 62 are in fluid communication with respective complexes 63 for filtering, deodorising and sterilising the air, connected to a pressurised air distribution line not shown. The tubes 55, 56 and 57 contain fluidising apparatus 64 similar to the fluidisers 28 described above for fluidising the mixture.

In the apparatus 53, after the step in which the ingredients are mixed in the mixer 59, the mixture is sent to the storage tank 60. The mixture is withdrawn continuously from the tank reservoir 60 to be refined in the mills 54 in succession. After refining by grinding, the mixture is discharged from the equipment 53 through the tube 57.

Before each mill 54, the mixture has micronized bubbles of compressed, deodorised, sterilised air blown into it through the microporous diffusers 62.

The equipment 55 enables the mixture to be given the desired qualitative characteristics of mixing and refining without recycling of the mixture within it.

EXAMPLE

With the use of the equipment (1) described schematically above and by means of the method of the present invention, 500 kg of sucrose, 300 kg of cocoa and 200 kg of cocoa butter were introduced into the mixer (2) and kept there, under agitation, at a temperature of 60° C. for an average stay time of 30 minutes, forming a homogeneous mixture.

This mixture was then conveyed to the mill (3) through the duct (4). Within the duct (4), filtered, deodorised, sterilised air was blown into the mixture at flow rate of 5 $Nm^3/h$ (1 $Nm^3$ of air corresponds to 1 $m^3$ of air at 0° C. and 1 atm) through the diffusers (30) with pore size of 5 $\mu$m so as to incorporate air bubbles with a diameter of about 5 $\mu$m in the mixture.

The mixture was ground in the mill (3) by means of the balls (19) for an average stay time of six minutes at a temperature of 60° C.

The mixture was then returned to the mixer (2) after its viscosity had been reduced by means of the fluidising apparatus (28).

This cycle was repeated four times, after which the mixture was subjected to a single cycle which differed from that described above in that no air was blown in and the mixture was subjected to a vacuum of 500 mm of Hg in the mill (3) by means of the vacuum pump (24).

Finally a mixture was withdrawn from the apparatus (1) through the duct (27) with excellent organoleptic qualities and a viscosity of 6000 mPa.s.

The method for the production of a mixture of solid particles dispersed in a continuous lipid phase according to the present invention enables the organoleptic characteristics of the final product to be improved appreciably compared with the prior art methods. In fact, the micronized gas bubbles blown into the mixture made intimate contact therewith, particularly with the solid particles, enabling the moisture and volatile components in the mixture to be removed.

Furthermore, since the microscopic gas bubbles easily penetrate the fatty layer around the solid particles, the reactions occur in the mixture which it is known from the prior art improve the organoleptic characteristics of the final product.

Furthermore the increase in the surface area of the solid particles achieved during grinding occurs in the presence of the microscopic gas bubbles.

The method of the invention requires much shorter periods for the working of the mixture than those required by the prior art methods, with a consequent increase in productivity.

The method of the invention improves the organoleptic characteristics of the mixture with an extremely small consumption of the gas since the microscopic bubbles of fluid are absorbed temporarily by the mixture and increase its volume.

The method according to the invention improves the rheological characteristics of the final product, rendering the mixture fluid.

The method of the invention enables dispersions/suspensions of solid particles in a lipid phase to be produced for cosmetic use, for example creams and toothpastes, and also edible products in general such as sauces and mustards.

Obviously variations may be made by an expert in the art to the method of the invention and to the equipment for carrying it out as described above in order to satisfy particular, contingent requirements without thereby departing from the protective scope of the invention as defined by the following claims. Thus, for example, the air blown in to the mixture may be replaced by a gaseous fluid selected from the group comprising nitrogen, carbon dioxide, argon or other inert gases according to requirements. In particular, in order to produce mixtures containing vegetable fats, such as derivatives of chocolate, it is preferable to blow nitrogen into the mixture instead of air. In fact, the oxygen in the air could oxidise the vegetable fats which would then go rancid. The introduction of micronized bubbles of inert gas however enables moisture and volatile acids to be eliminated from the mixture without making the mixture go rancid and in fact improving its shelf life.

The number of microporous diffusers and their surface area may be varied according to the quantity of gaseous fluid to be blown into the mixture. The diffusers may have a pore size other than the preferred one of 5 $\mu$m. Tests carried out have shown that diffusers having a pore size of from 1 $\mu$m to 30 $\mu$m are also suitable for the purpose.

I claim:

1. A method for the production of a mixture of solid particles dispersed in a continuous lipid phase comprising a mixing step in which the solid particles and lipids are mixed to form a mixture which is then subjected to a refining step in which the solid particles are ground and a step in which micronized bubbles of a gaseous fluid are temporarily incorporated in the mixture.

2. A method according to claim 1, wherein it includes a step in which the viscosity of the mixture is reduced by means of fluidising apparatus.

3. A method according to claim 1, wherein the said step in which micronized bubbles of a gaseous fluid are incorporated in the mixture precedes the refining step in which the solid particles are ground.

4. A method according to claim 1, wherein it includes a final step in which the mixture is kept at a pressure below atmospheric pressure to facilitate the escape of the volatile components.

5. The method for the production of a mixture of solid particles dispersed in a continuous lipid phase according to claim 1, comprising the steps of:

providing equipment comprising a mixer for mixing the starting materials to form the mixture, at least one mill for grinding the mixture, at least one duct connecting the mixer to the mill and through which the mixture flows, pumps for pumping the mixture between the mixer and the mill and means for blowing a gaseous fluid into the mixture including at least one microporous diffuser;

wherein the mixing step occurs in the mixer;

wherein the refining step occurs in said at least one mill; and wherein the micronized bubbles of the gaseous fluid are blown into the mixture by means of said at least one microporous diffuser.

6. The method according to claim 1, wherein the gaseous fluid is selected from the group consisting of air, nitrogen, carbon dioxide, argon and other inert gases.

7. The method according to claim 1, wherein the gaseous fluid is deodorised, sterilised compressed air.

8. The method according to claim 5, wherein the diffuser is housed in said duct.

9. The method according to claim 8, wherein the diffuser extends axially within the duct.

10. The method according to claim 5, wherein the diffuser comprises a tubular body with microporous surfaces.

11. The method according to claim 10, wherein the surfaces of the tubular body are made of sintered stainless steel.

12. The method according to claim 10, wherein the pore size of the tubular body is between 1 $\mu$m and 30 $\mu$m.

13. The method according to claim 5, wherein the mill is connected to suction means for exhausting the gaseous fluid therefrom.

14. The method according to claim 13, wherein the suction means comprise a vacuum pump.

15. The method according to claim 5, further comprising:
fluidising the mixture with a fluidising device which is connected to an outlet of the mill.

16. The method according to claim 15, wherein the fluidising device comprises a body defining an annular chamber having an inlet aperture and an outlet aperture, a baffle being inserted in the annular chamber for rendering an arc of the annular chamber unusable and for making the remaining arc of the annular chamber that extends between the inlet aperture and the outlet aperture obligatory pathway for the mixture, obstacles being provided in the obligatory pathway to the flow of the mixture.

17. The method according to claim 16, wherein said inlet aperture and the outlet aperture are arranged on either side of the said baffle at a predetermined angle of limited value.

18. The method according to claim 17, wherein the angle is 90°.

19. The method according to claim 15, wherein the obstacles comprise the periphery of a rotor rotatably supported in the body and in that the baffle is formed with an opening for the passage of the rotor.

20. The method according to claim 19, wherein the rotor has a peripheral velocity opposed to the velocity of the mixture in the obligatory pathway.

21. The method according to claim 1 wherein the gaseous fluid is substantially devoid of oxygen.

22. The method according to claim 21 wherein the gaseous fluid is nitrogen.

23. A method according to claim 1, wherein the micronized bubbles are incorporated in the mixture during grinding.

24. A method according to claim 1, wherein the micronized bubbles make intimate contact with the solid particles.

25. A method according to claim 4, wherein the micronized bubbles are removed under vacuum.

* * * * *